United States Patent [19]

Thaxter

[11] 4,195,243
[45] Mar. 25, 1980

[54] PIEZOELECTRIC WAFER MOVER

[75] Inventor: James B. Thaxter, Townsend, Mass.

[73] Assignee: Sperry Corporation, New York, N.Y.

[21] Appl. No.: 958,273

[22] Filed: Nov. 6, 1978

[51] Int. Cl.² .............................................. H01L 41/10
[52] U.S. Cl. .................................... 310/317; 310/328; 318/116
[58] Field of Search ................. 310/317, 26, 328, 330, 310/331; 318/116, 118

[56] References Cited

U.S. PATENT DOCUMENTS

| | | | |
|---|---|---|---|
| 3,217,218 | 11/1965 | Steele | 310/328 X |
| 3,684,904 | 8/1972 | Galutva et al. | 310/328 |
| 3,808,488 | 4/1974 | Massa | 310/328 |
| 3,902,084 | 8/1975 | May, Jr. | 310/317 X |
| 4,019,073 | 4/1977 | Vishnevsky et al. | 310/330 X |

Primary Examiner—Mark O. Budd
Attorney, Agent, or Firm—Howard P. Terry; Albert P. Cefalo

[57] ABSTRACT

Apparatus for effecting movement, translation and rotation, of an object relative to a reference, is disclosed, comprising transducer means having a portion thereof fixed with respect to the reference and means frictionally coupling the transducer to the object for effecting movement thereof. In addition, means for applying a predetermined potential difference waveform to the transducer to accelerate the transducer with respect to the object is disclosed. The transducer is accelerated at an acceleration which exceeds the critical acceleration of the object with respect to the transducer thereby effecting relative motion therebetween and thereby, being capable of moving the object significantly further than the extent of movement of the transducer.

7 Claims, 19 Drawing Figures

| MOTION DESIRED / TRANSDUCER ACTIVATED | +x | −y | +y | −y | +θ | −θ |
|---|---|---|---|---|---|---|
| NO. 1 | − | + | 0 | 0 | + | − |
| NO. 2 | 0 | 0 | + | − | + | − |
| NO. 3 | + | − | 0 | 0 | + | − |
| NO. 4 | 0 | 0 | − | + | + | − |

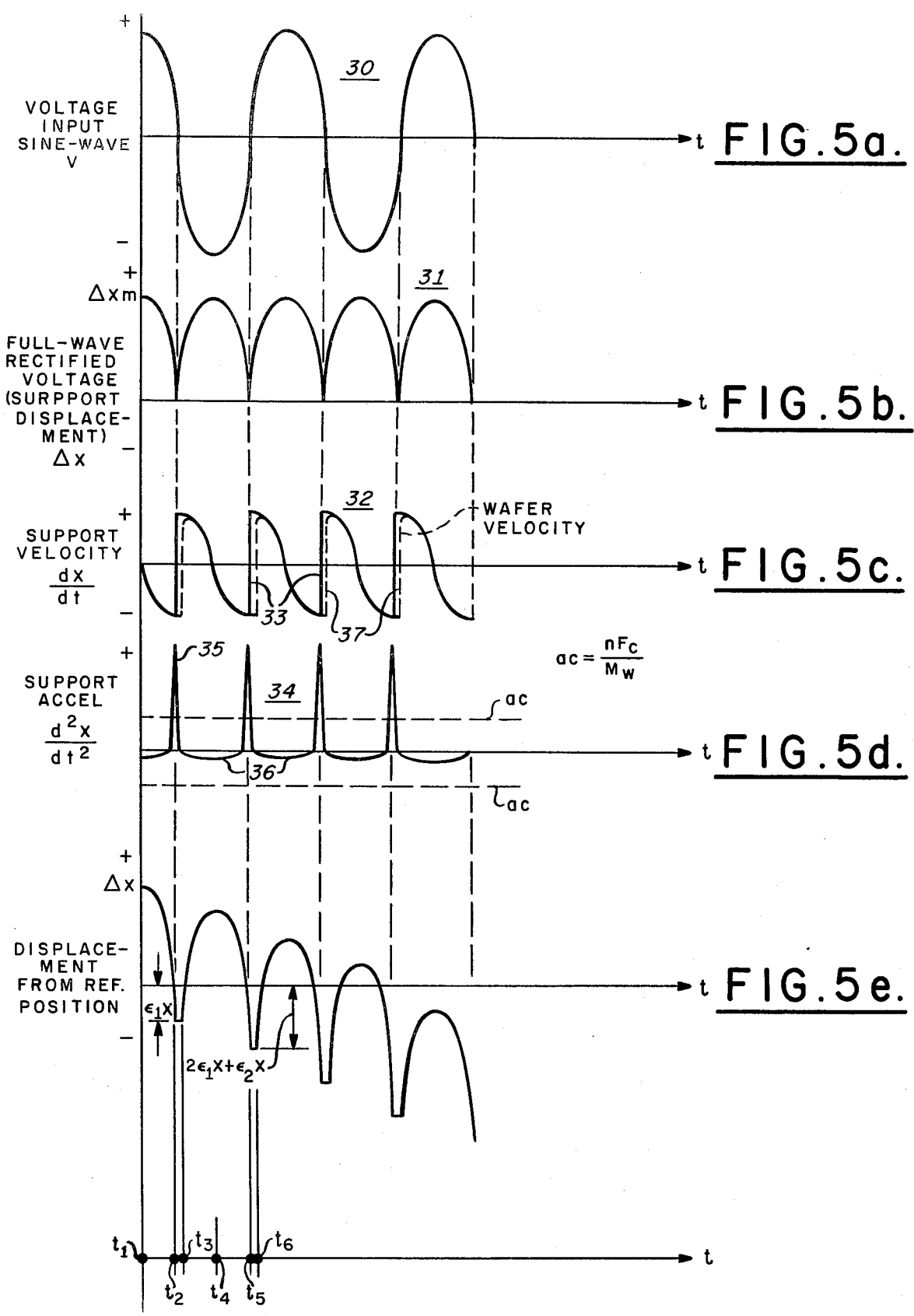

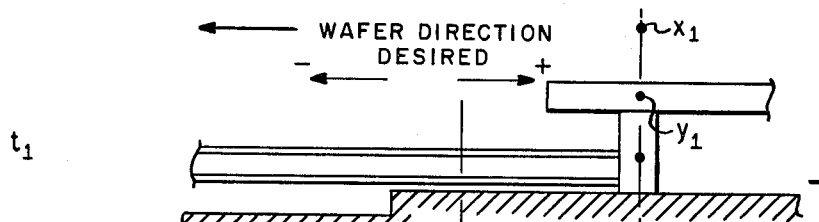
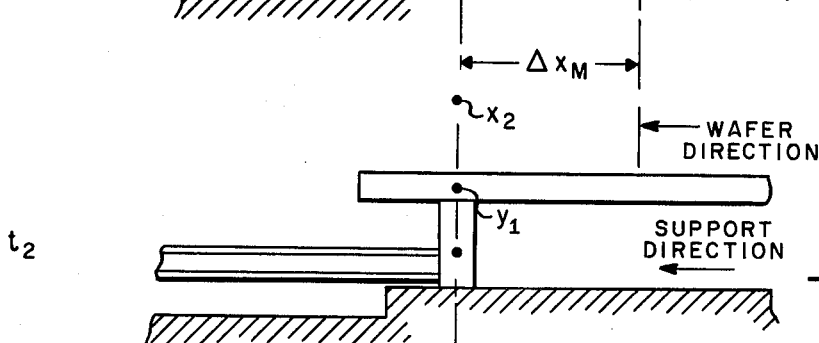
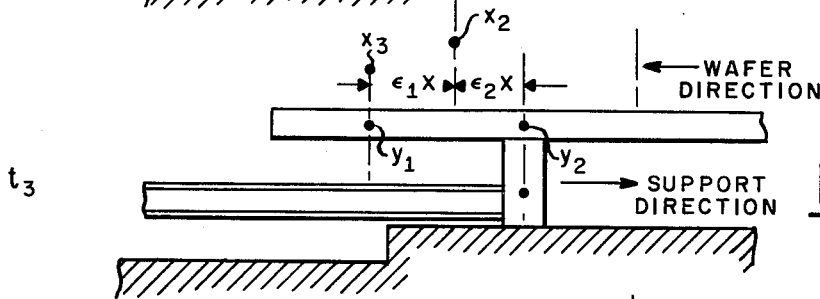
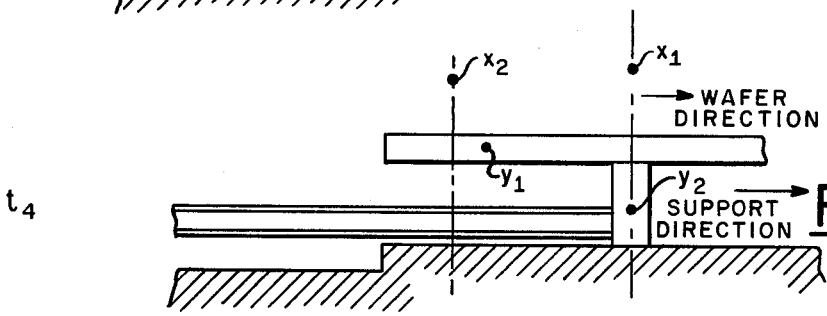
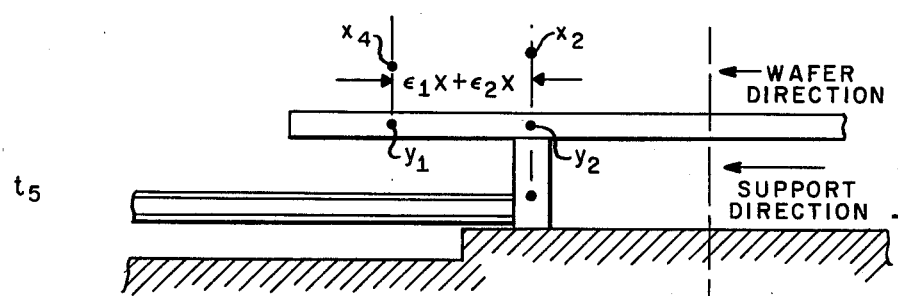
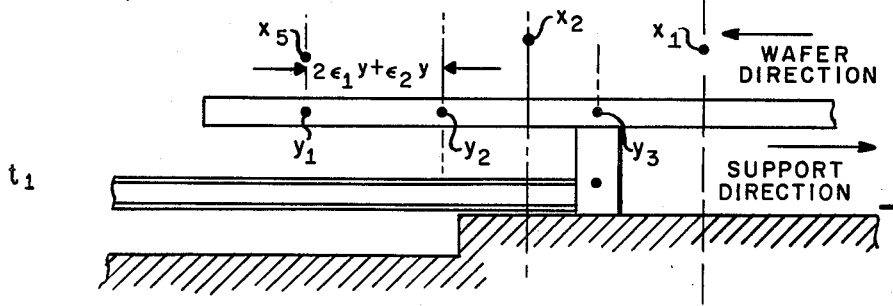

PIEZOELECTRIC WAFER MOVER

BACKGROUND OF THE INVENTION

1. Field of the Invention

This invention relates to a method and an apparatus for controlling the movement of an object with respect to a reference and, more specifically, to a method and an apparatus for moving exposure masks and/or substrate wafers for use in fabricating micro-lithographically generated circuits.

2. Description of the Prior Art

In general, the known lithographic techniques for fabricating microcircuits requires the accurate alignment of the substrate wafer with respect to the exposure mask. In the past, simple mechanical, screw-type, means for aligning the mask and the wafer have been used to align the translational and rotational positions of the mask and wafer. In this type of system, however, inevitable tolerances and torques build-up which affect the alignment.

In addition, other mechanical techniques for aligning the masks and wafers have been attempted, however, an electromechanical technique has been proposed to offset some of the problems of the prior art mechanical techniques. This electromechanical method for aligning the mask and substrate wafers envisions using a piezoelectric transducer coupled to the mask or wafer to displace the mask or wafer with respect to the other in response to a voltage applied to the transducer. For relatively low voltages, it is well known that the displacement of the transducer varies directly with the applied voltage. The displacement of a mask or wafer coupled to a transducer, therefore, is substantially linear with voltage such that precise electromechanical control, movement, of the wafer may be exercised by means of precise voltage control. At relatively high voltages, however, the linearity of transducer displacement with respect to voltage breakdown, thus the operating range of the transducer is limited by its breakdown voltage, which limits the total displacement of the wafer. That is, only limited displacements within the range of linearity of the transducer are available by means of this technique.

Accordingly, means for accurately effecting movement of an object such as an exposure mask or a substrate wafer relative to a reference or each other is required which is capable of effecting movement of the object beyond the range of linear motion of the transducer.

SUMMARY OF THE INVENTION

In accordance with the invention, apparatus is provided which effects movement of an object such as a substrate wafer by means of a predetermined potential difference applied to a transducer frictionally coupled to the object. Specifically, the apparatus of this invention for effecting movement of an object relative to a reference comprises transducer means having a portion thereof affixed with respect to the reference and means frictionally coupling said transducer to the object. Furthermore, the apparatus includes means for applying a predetermined potential difference corresponding to a predetermined displacement signal to the transducer to asymmetrically accelerate the transducer in response thereto. The predetermined acceleration exceeds the critical acceleration of the frictional coupling of said object with respect to said transducer thereby effecting a relative motion therebetween. The predetermined voltage or displacement of the transducer having the above-described asymmetrical acceleration results in a "jogging" motion or displacement of the object, and a displacement of the object with respect to the transducer which thereby moves the object beyond the linear range of displacement of the transducer.

More specifically, this invention is directed to apparatus and a method for controlling the motion of an object. The invention includes a voltage source means for applying a predetermined voltage having predetermined characteristics, such that the voltage characteristics, which may be directly converted into the displacement of the transducer, imposes those characteristics on the transducer displacment. The predetermined voltage is below the breakdown voltage of the transducer such that the transducer's movement follows the predetermined voltage, i.e., the displacement is linear with voltage. The voltage characteristic is such that an asymmetrical acceleration of the transducer is produced. The acceleration has a portion thereof which accelerates the transducer beyond the critical frictional acceleration threshold of the object with respect to the transducer, i.e., the acceleration required to frictionally hold the object to the transducer. Thus, the object, free from the transducer, continues in motion, whereas the acceleration changes the transducer's motion. Accordingly, the transducer is displaced with respect to the object during this portion of the acceleration. Upon frictional reattachment or coupling of the transducer to the object, at a new object location, when the acceleration threshold is no longer exceeded, the linear motion with voltage may be continued. The result is a total displacement of the object with respect to the transducer. A second acceleration of the transducer beyond the critical acceleration establishes a new contact point on the object from which further movement with respect to the transducer is effected. The result of this invention is the capability of effecting a total movement of the object substantially greater than the maximum linear displacement with voltage of the transducer.

The various features of novelty which characterize the invention are pointed out with particularity in the claim annexed to and forming a part of this specification. For a better understanding of the invention, its operating advantages and specific objects obtained from its use, reference should be had to the accompanying drawings and descriptive matter in which there is illustrated and described a preferred embodiment of the invention.

BRIEF DESCRIPTION OF THE DRAWINGS

FIGS. 5a through 5e and 6a through 6f are useful in illustrating the operation of this invention.

FIGS. 7b through 7d are useful in illustrating the operation of FIG. 7a.

DETAILED DESCRIPTION OF THE PREFERRED EMBODIMENTS

For a more complete appreciation of the invention, attention is invited to the following description of the illustrative embodiments of the invention as shown in the attached drawings.

Figure 1:
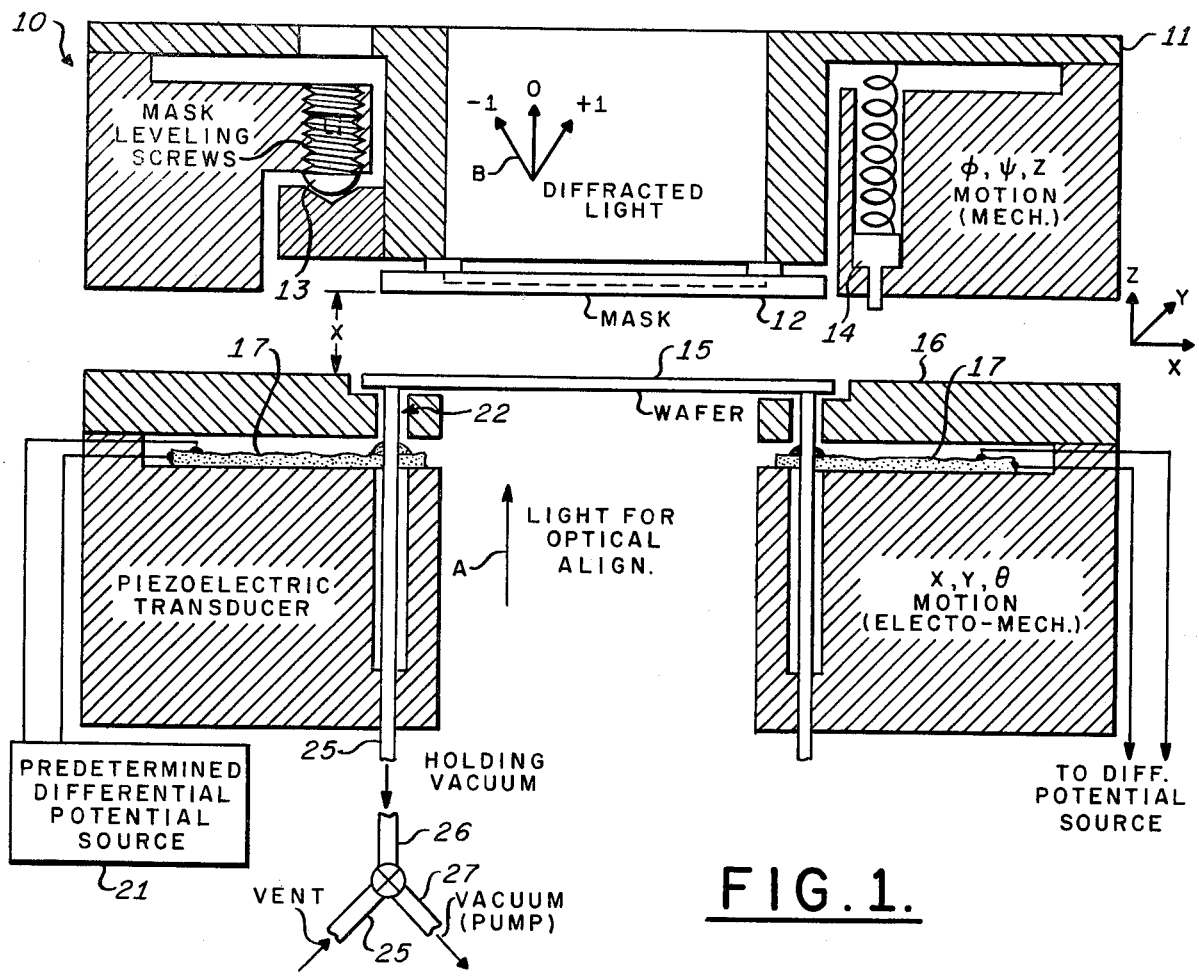
FIG. 1 is a schematic sectional diagram illustrating an alignment fixture employing the apparatus of this invention.

Referring to FIG. 1, a preferred embodiment of this invention is shown in combination with a schematic of wafer alignment fixture utilized in lithographic techniques for multi-step processing of substrates for example, wafers via conventional optical, X-ray or electron beam processes known in the art. The alignment fixture 10 includes a support plate 11 to which is attached an exposure mask 12. Alignment fixture 10 includes means, shown here as levelling screws 13 and springs 14 for orienting the exposure mask 12 with respect to a reference or a substrate wafer 15 supported by a further base plate 16 of the alignment fixture 10. The levelling screws 13 and springs 14 allow the mask to be rotated about two mutually perpendicular axes (x,y) and to be translated, in this figure, vertically with respect to the substrate wafer 15, along a third mutually perpendicular (z) or vertical axis. The substrate wafer 15, moreover, is translated along the two mutually perpendicular axes (x,y), in this embodiment of the invention perpendicular to the plane of the figure and more clearly shown in FIG. 3, and the wafer is allowed to rotate about the vertical axis (z) of the figure. In general, the wafer 15 is optically aligned with the mask 12 in a conventional manner. For example, as shown in FIG. 1, the wafer 15 is illuminated from below such that when viewed from a position vertically above the mask 12 a diffraction pattern resulting from grids formed on the respective mask and wafer (not shown) may be observed, as indicated by the illumination arrow A and diffraction arrow B in the figure.

As illustrated in FIG. 1, and more clearly shown in FIG. 2, the substrate wafer 15 is coupled to piezoelectric transducer 17 which, in accordance with this invention as explained hereinafter, affects the movement of the wafer. It is apparent that in the alternative or the conjunctive the mask 12 could be coupled for movement to a transducer in accordance with the invention, but for clarity purposes, it is not so shown. The piezoelectric transducer 17, in the preferred embodiment of this invention, a PZT transducer is affixed, at one end 18 (FIG. 2) thereof, by suitable means 19 to the base plate 16. The other or free end 20 is frictionally coupled to the substrate wafer 15. A predetermined potential difference or voltage source 21 is connected across the transducer 17 for applying a potential difference to the transducer to effect movement thereof. As shown in FIG. 1 and FIG. 3, a plurality of transducers coupled to respective voltage sources (not shown in FIG. 3) are utilized in accordance with this invention to affect the desired displacement and/or rotation of the substrate wafer 15 with respect to the mask 12 or any suitable reference, hereinafter referred to as the mask.

As indicated hereinabove, for applied potential differences below the breakdown voltage of the particular transducer the motion of the transducer in response thereto may be considered as an analog motion, i.e., directly proportional to or linear with applied voltage. As shown in FIG. 2, a change in length ($\Delta X$) of the transducer 17 of length (L), thickness (T), and inverse piezoelectric tensor component (d), wherein the transducer is poled normal to the electrodes, as shown, may be expressed as $$\Delta X \times d\, L/T\, V \tag{1}$$

Thus, the amplitude of the potential difference applied to the transducer determines the displacement of the particular transducer.

Figure 2:
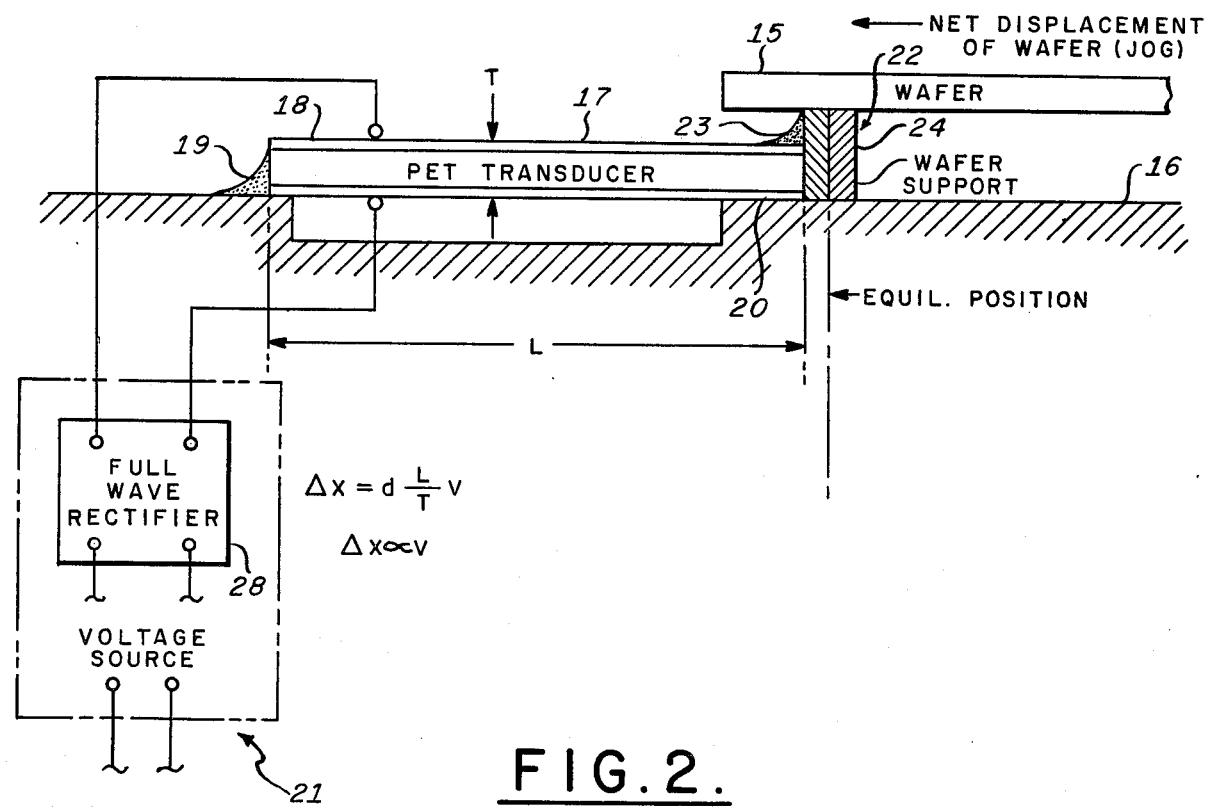
FIG. 2 schematically illustrates the apparatus of this invention.
Figures 3, 4:
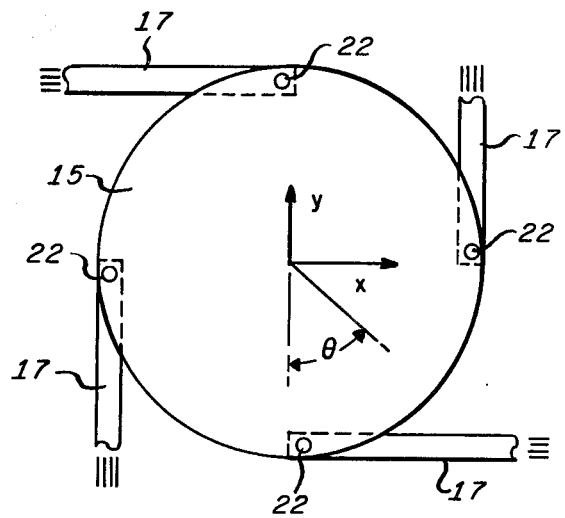
FIGS. 3 and 4 illustrate a method of utilizing this invention to move a wafer along two mutually perpendicular axes and about a third axis perpendicular thereto.

In the embodiment of the invention shown in FIGS. 1 and 2, the wafer 15 is coupled to the transducer 17 via a wafer support 22. The wafer support may be or form part of the transducer or may be a separate element as shown in FIGS. 1 and 2. The wafer is disposed on and frictionally coupled to the transducer at the wafer support. The wafer support 22 of this invention is affixed by any suitable means 23 (FIG. 2) to the transducer's free end 20. The first embodiment of the wafer support 22 (FIG. 2) may take the form of a simple column or support structure 24 or as shown in FIG. 1, the preferred embodiment of the wafer support 22 is a tubular support 25, having one end frictionally coupled to the wafer and the other end coupled via a valve 26 to a vent 25 open to the local atmospheric pressure acting on the wafer 15, or to a vacuum pump, illustrated by conduit 27, or other suitable low pressure means.

The tubular support 25 is coupled to the local ambient atmospheric pressure via vent 25 when no increased coupling of the wafer 15 to the wafer support 22 is desired. In addition, when an increased coupling force is desired, the tubular support 25 may be connected to a vacuum pump via line 27, for example, such that a differential pressure exists across the wafer exerting a further coupling force on the wafer at the support 22.

Referring now to FIG. 3, the wafer 15 is illustrated in plan view coupled to a plurality of piezoelectric transducers 17. The plurality of transducers 17 are shown disposed along two diameters of the wafer 15 and specifically along mutually perpendicular axes (x,y) to effect translation along these axes and rotation about a third axes (z) mutually perpendicular thereto. Illustrated in FIG. 4 in tabular format is the selective operation of the transducers to accommodate the desired motion in accordance with this invention as explained herein.

Utilization of piezoelectric transducers in accordance with this invention serves to provide precise electromechanical control of the wafer 15, thereby eliminating the need of applying extraneous torques to the wafer as is found in the prior art. Piezoelectric transducers as shown in the embodiments of the invention shown herein are advantageous in providing electrical control of the position of the wafer 15 by means of direct coupling thereto without intervening means such as motors, gears or levers. Automatic positioning of the wafer may thus be affected by taking advantage of the simple relation, the analog mode of operation, i.e., the change in transducer length versus applied potential difference (equation 1) which facilitates a simple feedback system for automatic control of wafer position.

In accordance with this invention, there are two modes of operation, the first or analog mode as described above indicates that the amplitude of the potential difference supplied to the transducer determines the displacement of the wafer support 22 frictionally coupled to the wafer. As is known in the art, application of a potential difference to a transducer below the breakdown voltage of the transducer displaces the transducer linearly with the voltage. Thus, in the analog mode the desired displacement of the wafer 15 is within the range of motion of the free end 20 of the transducer. For example, for a PZT transducer with a [d] of $10^{-10}$ M/V, a displacement of about 1 μm per 100 volts is typical. In order to obtain the high area packing density of current components, wafer-mask adjustments of ±0.1 μm are required and, accordingly, linear transducer displacement with applied voltage makes this alignment obtainable.

In accordance with the apparatus of this invention, a second mode of movement of a wafer is available for large movements of the wafer with respect to the mask. That is, the invention affects displacements beyond the limited range of motion of the transducer dictated by equation (1). A practical system which provides motion or displacement of a wafer greater than the maximum range of the transducer before electrical breakdown occurs, is provided in accordance with this invention by means of a "jogging" motion applied to the wafer by a predetermined, asymmetrical acceleration of the transducer. Referring to FIGS. 5a to 5e, the operation of the apparatus of this invention is described herein where FIG. 5a illustrates a typical predetermined potential difference from the voltage source means 21, a sine wave voltage 30. The voltage source 21 includes a predetermined wave shaping means 28 (FIG. 2), in this embodiment a full wave rectifier commonly known in the art. The full wave rectifier 28 converts the sine wave input of FIG. 5a to the full wave rectified voltage 31 of FIG. 5b. It is noted that the potential difference of FIG. 5b is less than the transducer's breakdown voltage. As equation (1) indicates, for potential differences less than the voltage of electrical breakdown of the transducer, the displacement ΔX is proportional to the applied potential difference and accordingly, FIG. 5b is proportional to and represents the transducer 17 and support 22 displacement with respect to the full wave rectified voltage input to the transducer. The full wave rectified wave form 31 (FIG. 5b) provides an appropriate driving signal for continual jogging of the wafer in accordance with this invention as it provides an asymmetrical acceleration, described herein. Moreover, the motion of the support 22 and free end 20 of the transducer will follow approximately the driving voltage of FIG. 5b as long as the important Fourier components of the waveform are below the mechanical resonances of the structure, which may be readily and conventionally arranged. Referring now to FIG. 5c, the velocity (dx)/(dt) 32 of the support 22 or the support point frictionally coupled to the wafers is proportional to the slope of the displacement ΔX of FIG. 5b as shown. The predetermined waveform, full wave rectified voltage 31 of FIG. 5b results in a periodic velocity waveform 32, FIG. 5c, wherein the velocity 32 is periodic, smoothly continuous from maximum positive to maximum negative but nearly discontinuous 33 from maximum negative to maximum positive at each new period. The derivatives of the velocity shown in FIG. 5d as the acceleration $d^2y/d_t^2$ 34 of the full wave rectified voltage 31, moreover, must include a "spike" or sharp increase 35 at each near discontinuity 33 in the velocity waveform 32, and relatively small wave crests 36 during the smoothly continuous function of the velocity curve 32 of each period. The acceleration of the predetermined waveform 31 results in an asymmetrical acceleration 34. According to this invention, therefore, a predetermined waveform voltage 31 may be applied to a transducer 17 to result in an asymmetrical acceleration 34 of the transducer. It is noted, that the input voltage is less than the breakdown voltage so that the mode of movement of the transducer is proportional to the voltage, but the asymmetrical acceleration 34 of the transducer results in the "jogging" motion of the wafer 15 in accordance herewith to produce significantly larger movements of the wafer than would be obtainable by the analog mode of operation.

As indicated by FIG. 5e, the wafer 15 is moved or displaced in a jogging fashion along the wafer supports, in a direction governed by the polarity of the rectified waveform which determines the sense of the asymmetric acceleration 34, as follows. Net motion of the wafer 15 occurs because at the time of the near discontinuity 33 the inertial force of the wafer opposing the driving force of the transducer exceeds the frictional shear force coupling the wafer 15 to the transducer 17 at the wafer support 22. That is, the critical acceleration ($a_c$) of the wafer is exceeded by the sharp spike 35 of the asymmetrical acceleration 34 of the transducer. The critical acceleration of the wafer ($a_c$) corresponds to the frictional coupling threshold which may be easily calculated knowing the coefficient of static friction $n_s$ between the wafer 15 and the support 22, the normal coupling force $F_c$ and the mass of the wafer $M_w$. Thus, the critical acceleration may be expressed as:

$$a_c = nF_c/M_w \qquad (2)$$

The critical acceleration $a_c$ is indicated in FIG. 5d where it is easily seen that the sharp acceleration spikes 35 exceed the critical acceleration of the wafer, whereas in the opposite direction, the shallow wave crests 36 of the remaining portion of the asymmetrical acceleration 34 do not exceed the critical acceleration. Thus, for the input potential difference corresponding to the shallow wave crest 36 portion of the transducer acceleration curve 34 the wafer 15 follows the transducer 17. However, for the sharp spike 35 portion, the wafer and transducer separate and break frictional contact. The inertial force of the wafer moves the wafer, at this time, without regard for the motion of the transducer. Accordingly, differential movements of the wafer with respect to the transducer are obtainable.

To further and more fully describe the "jogging" motion of the wafer illustrated in FIG. 5e, attention is directed to FIGS. 5 and 6 together, where FIG. 6 (FIGS. 6a through 6f) indicate the successive motion of one transducer 17 (for clarity purposes) and associated wafer 15 portion at six successive time intervals. At time $t_1$, FIGS. 5b and 6a indicate that the transducer 17 is at its maximum deflection, $\Delta X_m$, indicated as point $x_1$ in FIG. 6a. Furthermore, the wafer 15 is at its maximum (FIG. 5e) and a movement in the negative (an arbitrary notation) direction is desired. It is noted that at time $t_1$, the transducer velocity (FIG. 5c) is zero and increasing negatively and the transducer acceleration (FIG. 5d) is at its maximum for the shallow wave crest 36 portion. As the time interval progresses from time $t_1$ to time $t_2$ (FIGS. 5 and 6) the transducer displacement curve 31 (FIG. 5b) is decreasing the velocity curve 32 (FIG. 5c) increases negatively to its maximum, and because the critical acceleration $a_c$ has not been exceeded and the voltage potential is not greater than the breakdown voltage the wafer displacement decreases linearly (in the analog mode fashion) with the transducer 17 to which it is frictionally attached. At time $t_2$, the full wave rectified voltage has completed its period, the minimum deflection of the transducer has been reached at point $X_2$ (FIG. 6b) corresponding to a change of $\Delta X_m$, and with the start of the next periodic wave form the transducer's velocity 32 changes from maximum negative to maximum positive at the near discontinuity 33, resulting in the acceleration spike 35. The acceleration spike 35, moreover, exceeds the critical acceleration $a_c$ such that the wafer and the support disconnect and, therefore, the inertial force of the wafer causes the wafer 15 to move in the direction indicted (negative) at approximately the negative velocity at time $t_2$, point $X_2$ (see dashed curve 37, FIG. 5c). Concurrently, and in response to the spike acceleration 35, the transducer and support are translated in the positive direction towards point $X_1$. At time $t_3$ the sharp spike acceleration 35 has fallen to or below the critical acceleration $a_c$ value and reattachment of the wafer 15 and support 22 occurs at point $y_2$ on the wafer (FIG. 6c). Thus, as shown in FIGS. 5e and 6c, the wafer 15 has moved to point $X_3$ a distance $\epsilon_1 X$, negatively, equal to the wafer's negative velocity at the moment the transducer breaks free times the time interval, $(t_3-t_2)$, while the support 22 has moved in the positive direction from the initial attachment point $y_1$ a distance equal to the transducer's positive decreasing velocity 32 (FIG. 5b) times the time interval $(t_3-t_2)$ to the new attachment point $y_2$. At time $t_4$ the maximum voltage of waveform 31 is reached corresponding to the maximum deflection of the transducer 17 and the support 22 back to the point $X_1$. It is noted that now point $y_2$ of the wafer is moved to the initial point $X_1$. From time $t_3$ to $t_4$ the acceleration lies along curve 36 below the critical acceleration and therefore the motion of the wafer follows the transducer. From time $t_4$ to time $t_5$ the velocity of the transducer is again increasingly negative and deflection towards the minimum is initiated. At time $t_5$ the minimum deflection of the transducer again occurs equal to the minimum deflection at time $t_2$, i.e., $\Delta X_m$. It is noted, however that the deflection of the wa er point $y_1$ is now equal to $(\Delta X_m + \epsilon_1 X + \epsilon_2 X)$, point $X_4$, FIG. 6c, negatively. Again, for another period of waveform 31 the critical acceleration is exceeded, the wafer-transducer support frictional coupling is overcome, the wafer continues negatively at its negative velocity times the time interval $(t_5-t_6)$ for a distance equal to $\epsilon_1 X$ again, and the wafer support moves positively in accordance with the velocity curve 32 a distance equal to $\epsilon_2 X$ to a new attachment point $y_3$, as shown in FIGS. 5e and 6f. Thus, the positive value full wave rectified voltage 31 (FIG. 5b) or, more specifically, the asymmetrical acceleration 34 thereof displaces the wafer 15 in the negative direction in a "jogging" fashion, i.e., increasing then decreasing, such that the net displacement for a given time period or set of pulses may exceed the maximum displacement obtainable by the transducer 17 in the analog mode of operation.

Referring to FIG. 4, the motion of the wafer 15 along the x and y axes or about the z axis may be obtained by positive or negative potential difference inputs, of asymmetrical acceleration greater than the wafer critical acceleration. For example, if the desired wafer motion is along the +y axis, transducers #1 and #3 are not activated, as represented by an "0", and transducers #2 and #4 are activated as represented by an "+", positively and "−", negatively, respectively.

As indicated above in equation (2), the wafer critical acceleration $a_c$ is a function of the normal coupling force $F_c$, or the frictional coupling. Therefore, the tubular support 25 coupled to a vacuum or low pressure, relative to the local wafer atmospheric pressure, via the valve 26, such as an electrically controlled valve, provides a convenient way to adjust the coupling force both through regulation of the pressure in the tubular support tube 25 and control of the size of the tubular supports in contact with the wafer. By means of the regulation of the frictional coupling and normal coupling forces, adjustments in the acceleration threshold, critical acceleration, may be easily made and may be made significantly smaller than the "spike" 35 acceleration of the transducer such that the velocity of the wafer during separation may be adjusted relative to the maximum negative velocity 32 (FIG. 5c) of the transducer.

Figure 7A:
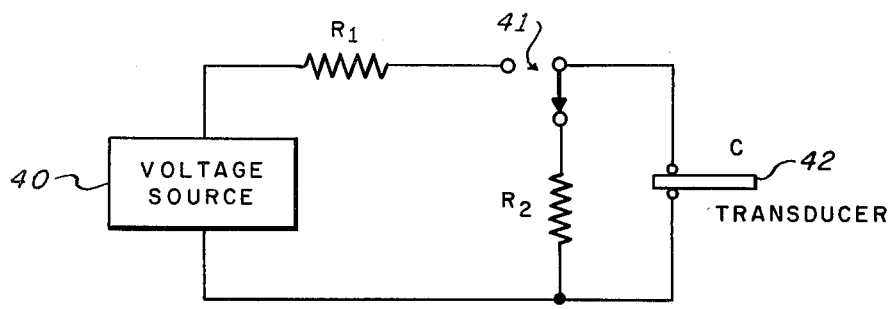
FIG. 7a illustrates an additional embodiment of this invention.
Figure 7B:
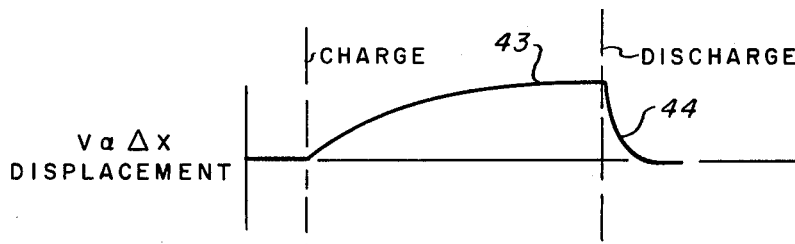
Figure 7C:
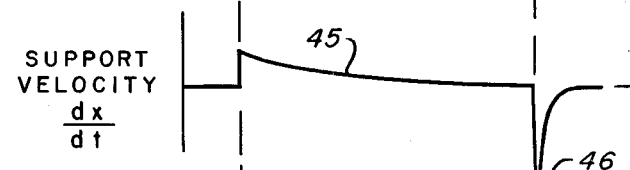
Figure 7D:
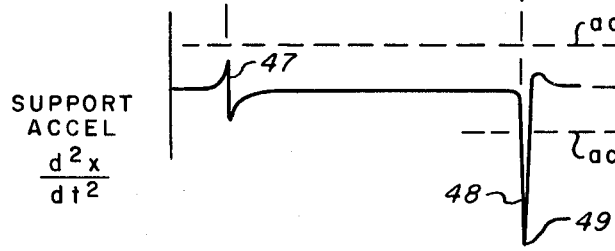

In accordance with this invention increased movement of an object such as a wafer 15 greater than the maximum movement of a transducer attached thereto may be obtained by means of predetermined applied potential differences having asymmetrical acceleration waveforms. Accordingly, a further embodiment of this invention is shown in FIGS. 7a to 7d and specifically in FIG. 7a wherein the jogging action of the apparatus of this invention is performed by means of a single pulse in contrast to the continuous train of potential difference pulses illustrated in FIG. 5b. The apparatus of FIG. 7a includes a reversible d.c. voltage source 40 commonly known in the art, coupled to a transducer 42 of capacitance C via a switch 41. The switch 41, which may be an electronic switch, couples the transducer 42 to the reversible d.c. voltage supply 40 through a first resistor R1, through which the transducer is charged. In operation, the switch 41 disconnects the voltage source 40 and resistor R1 from the transducer 42 wherein the transducer is coupled to a second resistor R2 through which the transducer discharges. As shown in FIG. 7b the voltage or displacement $\Delta X$ curve 43 of the $R_1 C$ circuit may be significantly different from the voltage-displacement $\Delta x$ curve 44 during discharge of the transducer 42 in the $R_2 C$ circuit by appropriately choosing the values of $R_1$ and $R_2$. As shown in FIGS. 7c and 7d the velocity and acceleration curves respectively, the predetermined voltage wave forms 43 and 44 result in an asymmetrical velocity 45, 46 and, more importantly, an asymmetrical acceleration 47, 48 werein a sharp "spike" 49 significantly greater than the critical acceleration $a_c$ is obtainable. It is noted that in this embodiment the wafer will move in accordance with the hereinabove explanation and will follow the single pulse charging voltage 45.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. Apparatus for effecting movement of an object relative to a reference comprising:

transducer means having a portion thereof fixed with respect to the reference;

means frictionally coupling said transducer means to said object; and means for applying a potential difference to said transducer means to accelerate said frictional coupling means and said transducer means, the potential difference being selectively capable of exceeding the critical acceleration of said object with respect to said frictional coupling means for effecting relative motion between said frictionally coupling means and said object.

2. Apparatus for effecting movement of an object relative to a reference according to claim 1 wherein said means frictionally coupling said transducer means to said object includes a tubular support fixed to a portion of said transducer for effecting movement, said tubular support being controllably coupled to said object.

3. Apparatus for effecting movement of an object relative to a reference according to claim 2 wherein said coupling means includes a valve selectable coupling said tubular support to atmospheric pressure and a pressure less than atmospheric.

4. Apparatus for effecting movement of an object relative to a reference according to claim 1 wherein said voltage means includes a rectifier for converting a periodic potential difference to a waveform capable of accelerating said transducer means and said frictional coupling means for effecting said relative motion.

5. Apparatus for effecting movement of an object relative to a reference according to claim 1 wherein said voltage means includes a reversible direct current supply and switch means for selectably coupling and decoupling the transducer means to the supply.

6. Apparatus for effecting movement of an object relative to a reference according to claim 1 wherein said transducer means includes a plurality of transducers so arranged to effect translation along a first and a second axis of the object and rotation about a third axis perpendicular thereto.

7. A method of moving an object relative to a reference comprising the steps of:
fixing a portion of a transducer with respect to the reference;
coupling said object with respect to the free portion of said transducer with a frictional coupling means;
applying a potential difference having an asymmetrical waveform across said transducer to effect movement thereof; and
selecting said potential difference such that the acceleration of said transducer is capable of exceeding a critical acceleration of said object with respect to said coupling means, for effecting a relative movement between said coupling means and said object.

* * * * *